US006885481B1

(12) United States Patent
Dawe

(10) Patent No.: US 6,885,481 B1
(45) Date of Patent: Apr. 26, 2005

(54) SYSTEM AND METHOD FOR AUTOMATICALLY ASSIGNING A FILENAME TO A SCANNED DOCUMENT

(75) Inventor: Julie T Dawe, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/502,941

(22) Filed: Feb. 11, 2000

(51) Int. Cl.$^7$ ................................................. H04N 1/46
(52) U.S. Cl. ..................... 358/505; 358/403; 358/462; 358/474; 382/305; 382/317
(58) Field of Search ................. 358/505, 400, 358/401, 403, 462, 474; 382/305, 290, 292, 306, 317; 707/1, 205, 204, 102

(56) References Cited

U.S. PATENT DOCUMENTS

| | | | | |
|---|---|---|---|---|
| 5,179,649 A | * | 1/1993 | Masuzaki et al. | 715/507 |
| 5,202,982 A | * | 4/1993 | Gramlich et al. | 707/2 |
| 5,339,412 A | * | 8/1994 | Fueki | 707/104.1 |
| 5,428,727 A | * | 6/1995 | Kurosu et al. | 715/502 |
| 5,448,375 A | * | 9/1995 | Cooper et al. | 358/403 |
| 5,451,760 A | * | 9/1995 | Renvall | 235/375 |
| 5,751,921 A | * | 5/1998 | Fujimoto | 358/1.9 |
| 5,828,783 A | * | 10/1998 | Ishigaki | 382/186 |
| 5,838,819 A | * | 11/1998 | Ruedisueli et al. | 382/187 |
| 5,848,202 A | * | 12/1998 | D'Eri et al. | 382/306 |
| 5,893,908 A | * | 4/1999 | Cullen et al. | 707/5 |
| 5,907,835 A | * | 5/1999 | Yokomizo et al. | 707/1 |
| 6,138,129 A | * | 10/2000 | Combs | 707/6 |
| 6,192,165 B1 | * | 2/2001 | Irons | 382/306 |
| 6,226,422 B1 | * | 5/2001 | Oliver | 382/313 |
| 6,473,203 B1 | * | 10/2002 | Hisatomi et al. | 358/403 |
| 6,577,409 B1 | * | 6/2003 | Barker et al. | 358/468 |
| 6,602,298 B1 | * | 8/2003 | Kirshenbaum | 715/501.1 |
| 6,646,765 B1 | * | 11/2003 | Barker et al. | 358/474 |
| 6,738,780 B1 | * | 5/2004 | Lawrence et al. | 707/101 |
| 6,741,743 B1 | * | 5/2004 | Stalcup et al. | 382/217 |
| 6,820,237 B1 | * | 11/2004 | Abu-Hakima et al. | 715/531 |

FOREIGN PATENT DOCUMENTS

| | | | | |
|---|---|---|---|---|
| JP | 04-297960 | * | 10/1992 | G06F/15/62 |
| JP | 05-108794 | * | 4/1993 | G06F/15/62 |
| JP | 05-274361 | * | 10/1993 | G06F/15/40 |
| JP | 05-274464 | * | 10/1993 | G06K/9/00 |
| JP | 05-342328 | * | 12/1993 | G06F/15/62 |
| JP | 06-038017 | * | 2/1994 | H04N/1/32 |
| JP | 06-052236 | * | 2/1994 | G06F/15/40 |
| JP | 06-348805 | * | 12/1994 | G06F/15/62 |
| JP | 060348805 A | | 12/1994 | G06F/15/62 |
| JP | 07-056779 | * | 3/1995 | G06F/12/00 |
| JP | 07-134706 | * | 5/1995 | G06F/17/21 |
| JP | 070134706 A | | 5/1995 | G06F/17/21 |
| JP | 09-231309 | * | 9/1997 | G06K/9/03 |
| JP | 09-251525 | * | 9/1997 | G06T/1/00 |
| JP | 11-224326 | * | 8/1999 | G06T/1/00 |
| JP | 2001-101166 | * | 4/2001 | G06F/17/21 |

* cited by examiner

Primary Examiner—Kimberly Williams
Assistant Examiner—Tia Carter

(57) ABSTRACT

Automatic filename assignation logic automatically assigns a filename and extension to a scanned image, thus eliminating the need for the user to interactively assign the filename. The automatic filename assignation logic together with the document analysis and processing logic determines the appropriate filename under which to save the scanned document by searching a predefined region within the document for a filename and an extension. A user may preselect the region or the region may be a default region applied to all scanned documents unless the automatic filename assignation logic is otherwise instructed. Alternatively, the presence of a notation, such as a "POST-IT®" note on a page is searched for, and, if discovered, the information contained in the notation (the desired filename and extension) becomes the name under which the automatic filename assignation logic saves the document.

26 Claims, 7 Drawing Sheets

SYSTEM AND METHOD FOR AUTOMATICALLY ASSIGNING A FILENAME TO A SCANNED DOCUMENT

TECHNICAL FIELD

The present invention relates generally to electronic scanning devices, and, more particularly, to a system and method for automatically assigning a filename to a scanned document.

BACKGROUND OF THE INVENTION

Scanning devices are useful in many applications where it is desirable to transfer an image from printed form into electronic form. Scanners capable of reading and converting a page into electronic format have been available for quite some time. Typically, a scanner will electronically read a page and electronically store the information for later presentation and use.

After scanning, the electronic version of the scanned document is typically saved onto a computer disk using a filename. Typically the filename is queried from the user, requiring interaction between the user and the scanner software. Alternatively, and to avoid querying the user, a standard filename having a unique number for each scanned document might be used. For example, the scanner software might assign the filename "scan1.jpg" to the first scanned document and the filename "scan2.jpg" to the next scanned document, and so on. Another manner in which filenames have been assigned to scanned documents is to query the user as to how the document is to be processed. For example, as a Word (.doc) document, as a bitmap in JPEG (.jpg) format, or as a text document in plain text (.txt). Still another manner in which a filename may be assigned is to use a standard "File Save As" dialog box.

Unfortunately, all the existing methods for assigning a filename to a scanned document require either interaction between the user and the software, or will assign a filename that is non-descriptive of the content of the scanned image.

Therefore, a need exists for an automatic filename assignation system in which a filename that is descriptive of the scanned image is automatically created and applied to the document with little or no interaction from the user.

SUMMARY OF THE INVENTION

The invention provides a system and method for automatically assigning a filename to a scanned document.

Architecturally, the present invention can be conceptualized as a system for automatically assigning a filename to a scanned image. The system includes a scanner, a document analysis and processing software component in communication with the scanner, and automatic filename assignation logic in communication with the document analysis and processing software component. The automatic filename assignation logic is configured to detect a region in a scanned image, the region including filename information, and assign a filename to the scanned image based upon the detected filename information.

The present invention may also be conceptualized as a method for automatically assigning a filename to a scanned image, comprising the steps of: scanning an image in a scanner, detecting a region in the scanned image, the region including filename information, and assigning a filename to the scanned image based upon the detected filename information.

The invention has numerous advantages, a few of which are delineated, hereafter, as merely examples.

An advantage of the invention is that it permits the scanner software to automatically assign a filename to a scanned document without querying the user.

Another advantage of the invention is that it improves batch processing speed by eliminating the need for a user to assign filenames to scanned documents and by eliminating the need for a user to reassign filename after the software arbitrarily assigns a filename that is not descriptive of the content of the scanned document.

Another advantage of the invention is that it allows the user to determine whether handwriting on a predetermined portion of a scanned document or whether a notation on the scanned document will provide the basis for the automatic filename assignation.

Another advantage of the invention is that a user may indicate the format under which to save the document by indicating a desired filename extension with which to process the document, such as, for example, .rtf, .jpg, etc.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

The automatic filename assignation logic of the present invention can be implemented in software, hardware, or a combination thereof. In a preferred embodiment(s), the automatic filename assignation logic is implemented in software or firmware that is stored in a memory and that is executed by a suitable instruction execution system (microprocessor). If implemented in hardware, as in an alternative embodiment, the automatic filename assignation logic can implemented with any or a combination of the following technologies, which are all well known in the art:

a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, the automatic filename assignment software, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Moreover, while the automatic filename assignment logic will be illustrated hereafter with respect to the recognition of text, the automatic filename assignment logic is useful for automatically recognizing any other attribute of a scanned image, for example but not limited to drawings, photographs, equations, graphics, lineart, etc.

Figure 1:
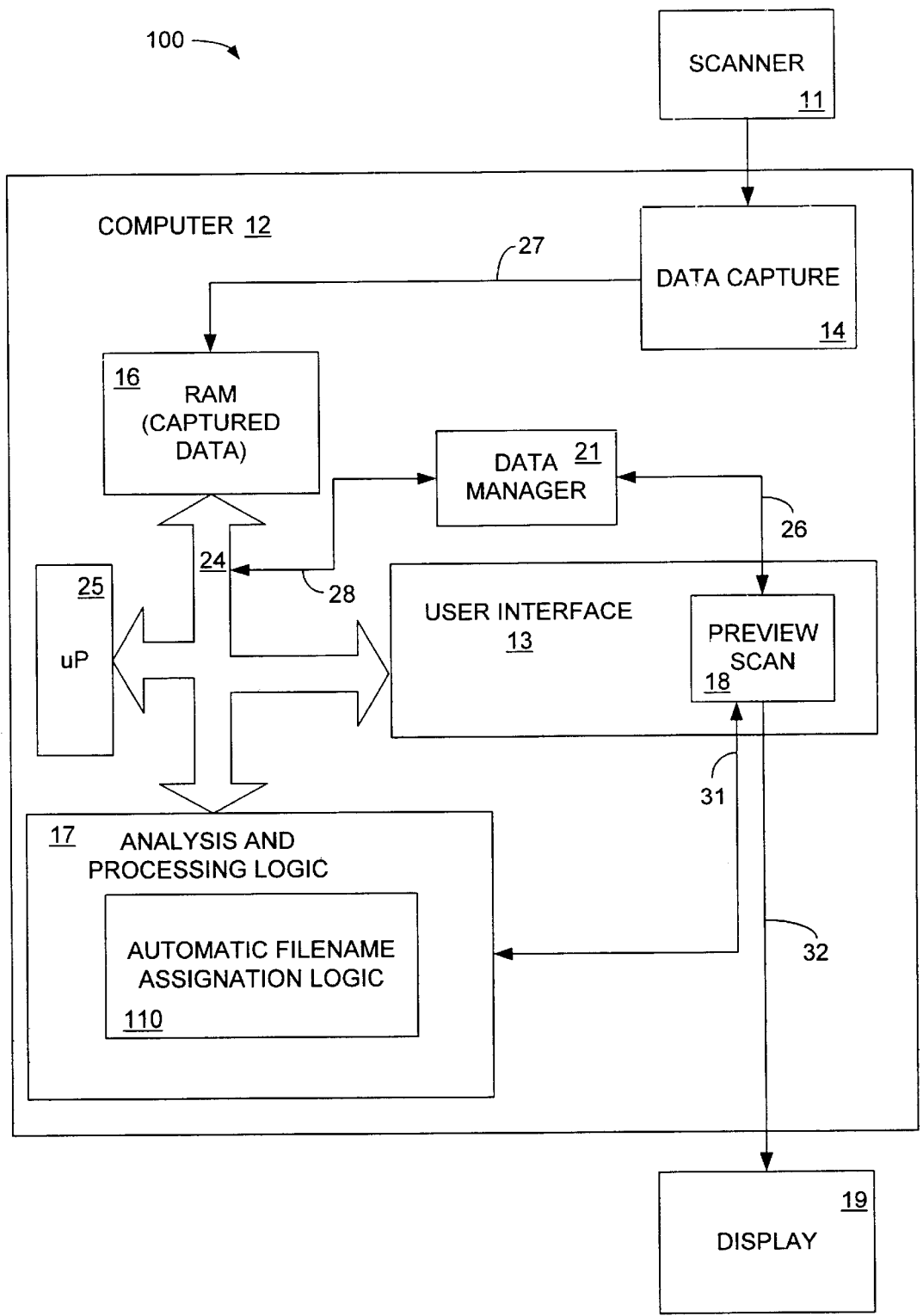
FIG. 1 is a schematic view of an exemplar scanner and computer system in which the automatic filename assignation logic of the present invention resides.

Turning now to FIG. 1, shown is a schematic view of an exemplar scanner and computer system 100 in which the automatic filename assignment logic 110 of the present invention resides.

Illustratively, scanner 11 scans a document placed therein in cooperation with computer 12. Computer 12 can be any general purpose computer that is capable of connecting to and executing the software that enables scanner 11 to function. Illustratively, computer 12 is a personal computer, however, computer 12 may be any computer capable of communicating with scanner 11. A scanned image is captured by data capture element 14 located within computer 12. The scanned image data is then stored in random access memory (RAM) 16. RAM 16 communicates with analysis and processing logic 17, user interface 13 and microprocessor (uP) 25 over bus 24.

Analysis and processing logic 17, together with automatic filename assignment logic 110, is illustratively the logic that operates in conjunction with scanner 11 to determine the region of the scanned image within which to inspect for indication of the filename to assign to the image. Alternatively, analysis and processing logic 17, together with automatic filename assignment logic 110, may inspect the image for a notation, such as the presence of a "POST-IT®" note on the document. These notes are generally adhered to documents with an easily removable adhesive. If a notation is detected on the scanned document, the logic will analyze any writing present on the notation and automatically assign a filename to the saved document, based upon the content of the writing, as will be described more fully below.

All identifying elements of a scanned image, such as type, location and statistics of the scanned image are captured by data capture element 14 and stored as captured data in RAM 16. Furthermore, analysis and processing logic 17 in conjunction with uP 25 is the underlying processing engine that maintains the scanned image data. Analysis and processing logic 17 includes automatic filename assignment logic 110, which will be described in greater detail below with respect to FIG. 2. Automatic filename assignment logic 110 resides within analysis and processing logic 17, which communicates with data manager 21 over bus 24 and connection 28. Data manager 21 communicates with bus 24 over connection 28 in order to access the data stored in RAM 16 in order to perform the preview scan operation or other post analysis tasks. Preview scan is a feature of many scanner programs and enables a user to preview the scanned image on a computer monitor prior to scanning. The present invention is not reliant upon the preview scan operation. Indeed, the preview scan operation may be omitted in some applications, for example when batch processing. Post analysis tasks may include, for example, printing, faxing, optical character recognition, etc.

In one particular embodiment, automatic filename assignment logic 110 enables the analysis and processing logic 17 to recognize a predetermined portion, or region, of a scanned image in which a user has indicated a desired filename, and perhaps a desired filename extension. For example, a user might instruct the scanner software to inspect the upper right hand portion of a scanned image for a filename that the user wishes to save the scanned document under.

Typically, the scanner analysis and processing logic will divide the scanned document into different regions, depending upon the information contained in the document. For example, assuming that there are both text and a photograph in the document, the scanner analysis and processing logic recognizes the two different types of information (text and a photograph) and assigns each of the different types of information to a region. The text is one region and the photograph is another region. Alternatively, a user of the scanner may manipulate and assign different regions to the different types of information. The technology used to define and assign different regions will not be described in detail. Many other types of information may be included in a document and assigned a region.

In another embodiment, automatic filename assignment logic 110 enables the analysis and processing logic 17 to recognize the presence of a notation on the document. If a notation is detected, then the automatic filename assignment logic 110 will analyze the notation for writing and use that information to automatically assign the filename to the scanned document.

In accordance with an aspect of the invention, by indicating a particular portion of the scanned document to the analysis and processing logic 17, a user may indicate a region of interest by interacting with the software and using a mouse and pointer to draw a bounding box around a portion of the scanned image that the user desires the software to analyze. Then, the user could write the desired filename in that area on the page before scanning. Alternatively, a user could draw a bounding box and use the above-mentioned region selection method to type the region of interest as "filename". When scanned, the software analyzes the previously indicated region of interest for handwritten text and assigns a filename, corresponding to the handwritten text, to the document.

Similarly, the analysis and processing logic 17, together with the automatic filename assignment logic 110, may use a color and hue recognition technique to locate a notation on the page. Any writing on the notation note would then be used to determine and automatically assign a filename to the scanned image.

Also included in computer 12 is user interface 13, which illustratively includes preview scan block 18. Preview scan 18 allows a user of a scanner to view the document to be scanned prior to final scanning, or otherwise, prior to sending the appropriate scanned data regions to downstream destinations (applications, storage, etc.). Preview scan 18 outputs the scanned image on connection 32 for output to a user on display 19.

Figure 2:
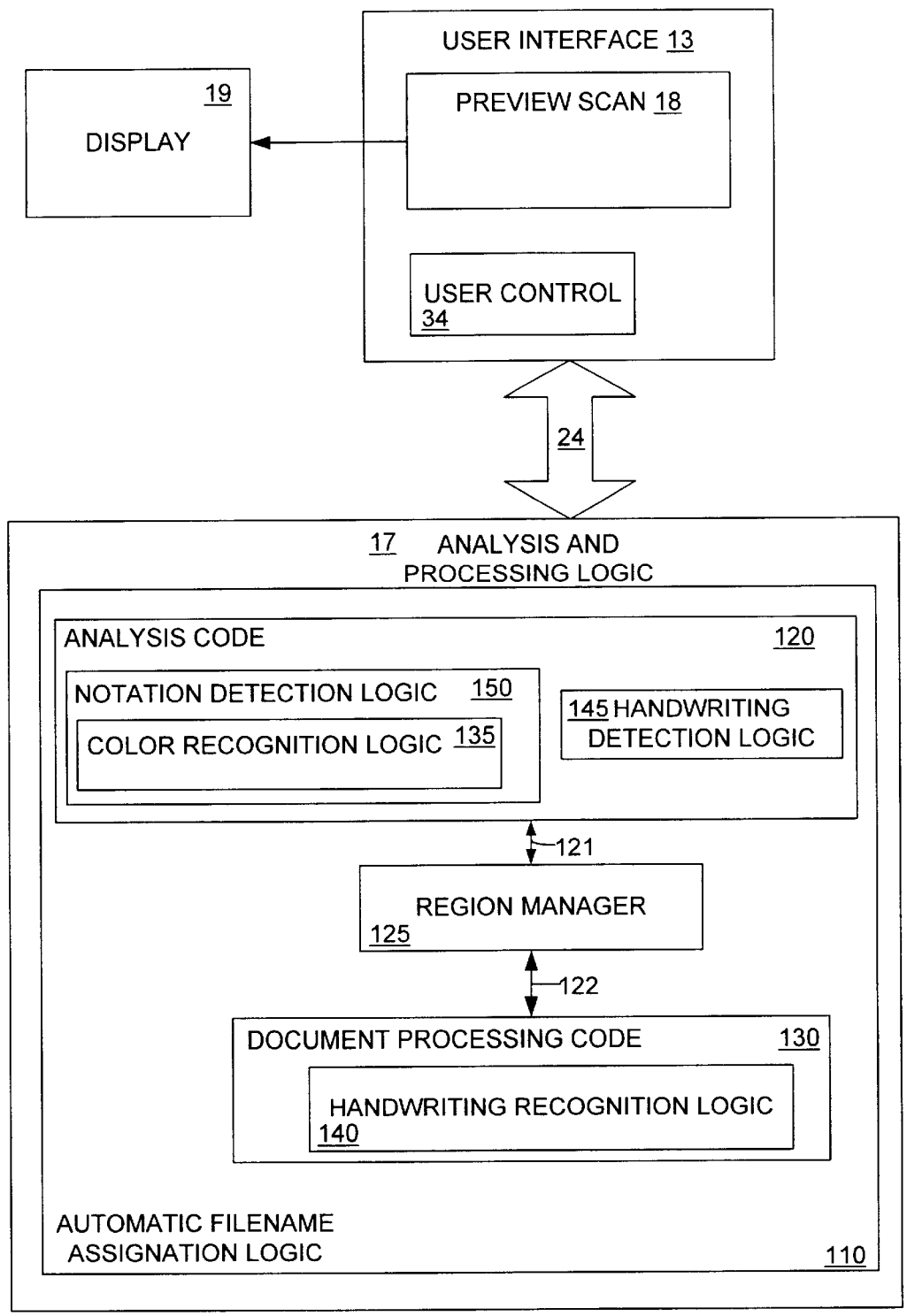
FIG. 2 is a schematic view illustrating the user interface and analysis and processing logic of FIG. 1 in which the logic of the present invention resides.

FIG. 2 is a schematic view illustrating the user interface 13 and analysis and processing logic 17 of FIG. 1, in which the automatic filename assignment logic 110 of the present invention resides. User interface 13 includes preview scan element 18 and user control 34. User control 34 may include any available means or method for interacting with the computer, and commonly includes a mouse, a stylus, or a computer keyboard. User control 34 can be used to communicate the region of the scanned page, in which the user has written, or otherwise indicated, the filename under which the document is to be saved. As discussed above, in some applications such as batch processing, the preview scan operation, and any user interaction may be omitted by predefining the region on the page in which the analysis and processing logic 17 is to search for the filename information.

Automatic filename assignment logic 110 resides within analysis and processing logic 17 and contains the logic necessary to allow a scanner to automatically assign a filename to a scanned image. Automatic filename assignation logic 110 includes analysis code 120, region manager 125 and document processing code 130.

If a region on a scanned image is predefined by a user as the region in which a filename is located, then analysis code 120 communicates with region manager via connection 121 to determine from region manager 125 the location on the image to investigate for the filename. Once the correct region is investigated and a filename is discovered, the analysis and processing logic uses handwriting detection logic 145 to detect handwriting in the selected region. Once the handwriting is detected, handwriting recognition logic 140 is used to analyze the handwriting so that a filename can be taken from the selected region and automatically assigned as the filename for the scanned image. If there is an extension included in the handwriting the extension will also be assigned. Alternatively, a default extension may be assigned if there is no extension included in the analyzed handwriting.

If the scanner software is configured by a user to search the scanned image for a notation, then analysis code 120 uses notation detection logic 150 to detect the presence of the notation. Notation detection logic 150 includes color recognition logic 135, which can detect the presence of color, such as the color of a notation. Once the notation is detected, document processing code 130 uses handwriting recognition logic 140 to read the filename from the notation and to save the document in the appropriate format using the detected filename. The notation may be omitted from the scanned image before presentation to the user.

User interface 13 communicates with analysis and processing logic 17 over bus 24. If the user desires, preview scan element 18 displays the filename information detected by the automatic filename assignment logic 110 on display 19. Once the document is viewed on display 19 during the preview scan operation 18, the user has an opportunity to confirm and accept the automatically assigned file and extension name, or to reject and assign a different filename and extension.

Figure 3:
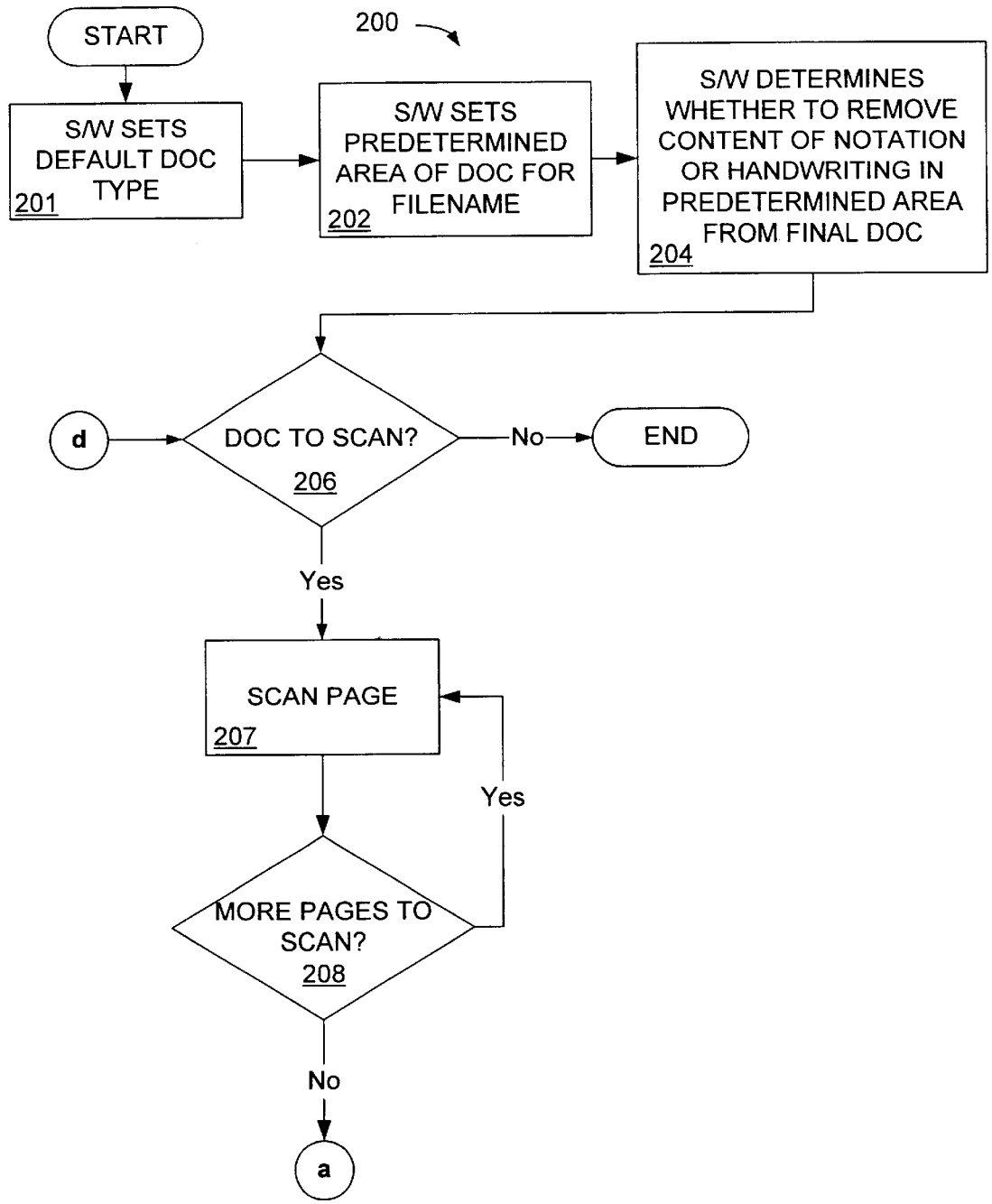
FIGS. 3 through 5 are flow diagrams collectively illustrating the operation of the automatic filename assignation logic of FIGS. 1 and 2.
Figure 4:
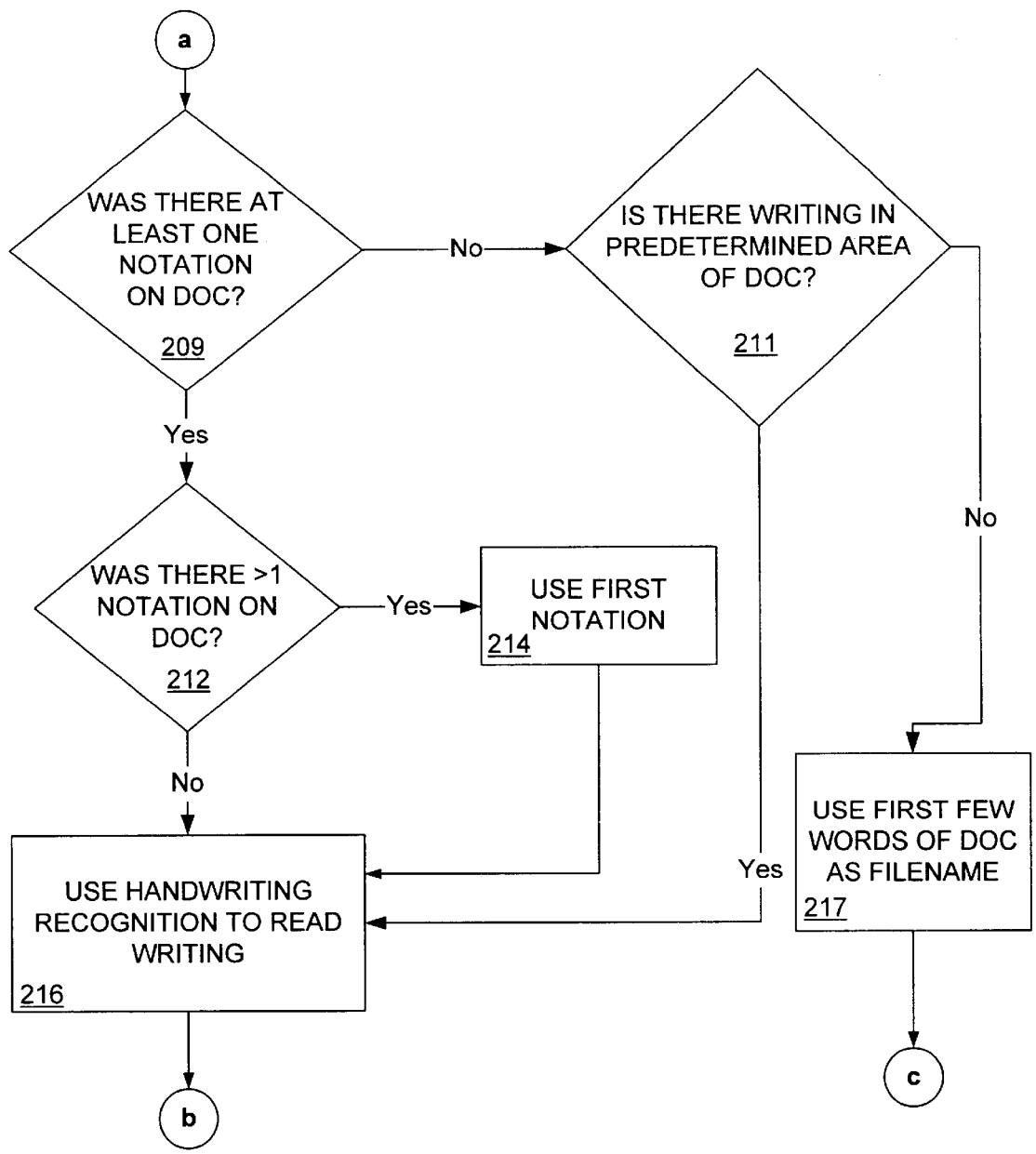
Figure 5:
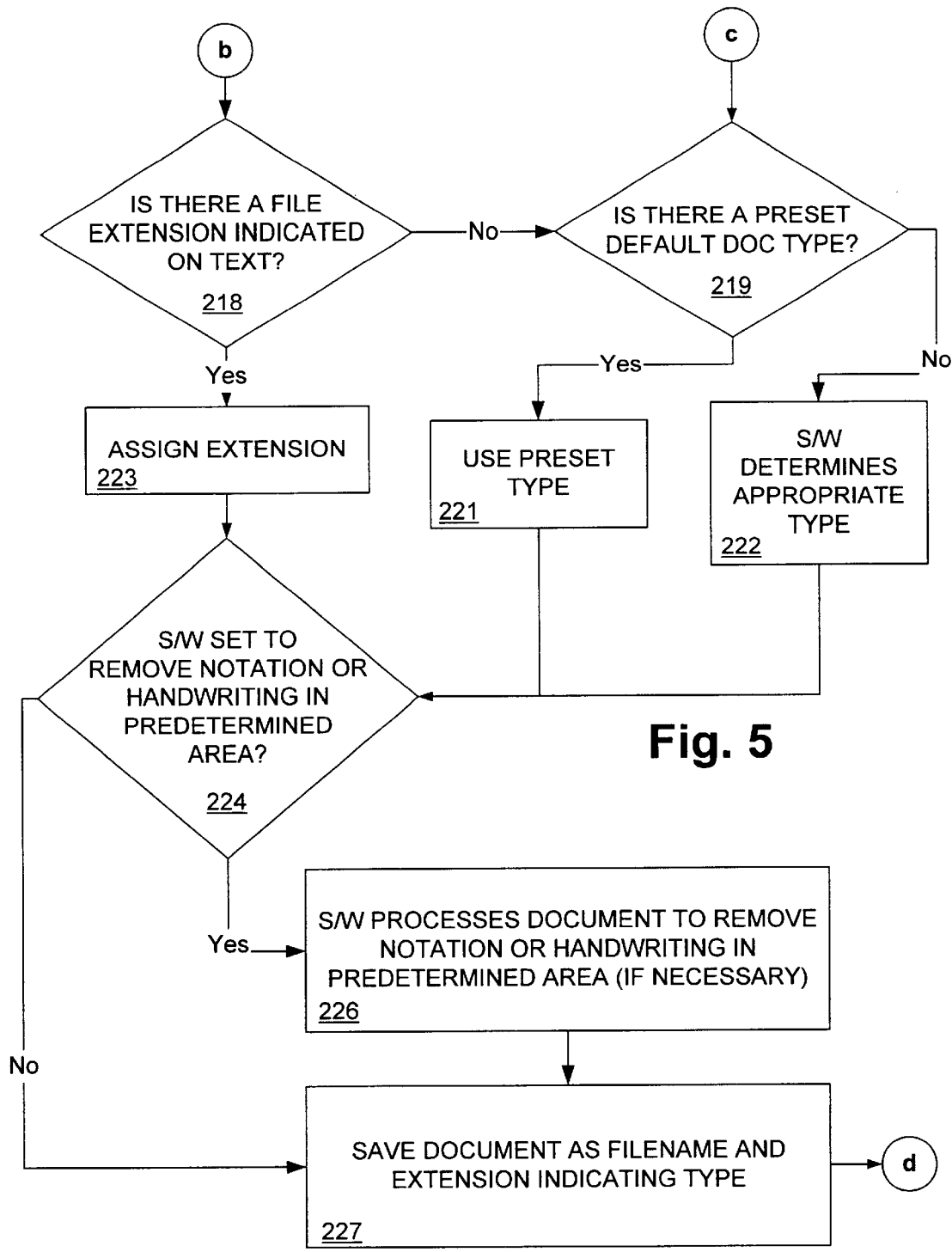

FIGS. 3 through 5 are flow diagrams collectively illustrating the operation of the automatic filename assignment logic of FIGS. 1 and 2. The flow charts of FIGS. 3 through 5 show the architecture, functionality, and operation of a possible implementation of the automatic filename assignation software of FIGS. 1 and 2. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3 through 5. For example, two blocks shown in succession in FIGS. 3 through 5 may in fact be executed substantially concurrently or the blocks may sometimes be executed in the reverse order, depending upon the functionality involved, as will be further clarified hereinbelow.

With reference to FIG. 3, in block 201, and in response to user input, the analysis and processing logic 17 sets the default document type. The default document type indicates the extension assigned to a scanned image by the software unless otherwise instructed by the user. For example, the default document type might be a ".doc" extension signifying a "Microsoft Word" type document. Alternatively, and to be discussed below, the document type (extension) may be determined by the automatic filename assignment logic 110 based on the detected filename.

In block 202, and in response to user input, the analysis and processing logic 17 sets a predetermined area of the scanned document in which to search for the filename. The predetermined area on the document can be anywhere on the document, but for illustration purposes, and to be described with respect to FIG. 6, the predetermined area of the document in which to search for the filename will be the upper right hand portion of a page. This step can be set either by user input (i.e., a user selecting a predetermined area on a scanned page through the use of a mouse and pointer), or may be predetermined by the analysis and processing logic 17.

In block 204, and in response to user input, the analysis and processing logic 17 is set to remove the content of the notation, or handwriting in the predetermined area of the document from which the filename was obtained, prior to presentation to the user.

The steps set forth in blocks 201, 202 and 204 may be performed automatically or may be set as defaults by the analysis and processing logic 17.

In block 206 it is determined whether there is a document on the scanner. If there is no document to be scanned then the process ends. If it is determined in block 206 that there is a document to scan, then in block 207 a page is scanned.

In block 208 it is determined whether there are additional pages to scan. If so, then scanning is continued in block 207. Once it is determined, in block 208, that there are no more pages to scan then, in block 209, it is determined whether there was at least one notation on the document. As used in this embodiment, a notation can be the above described "POST-IT®" note, the type of which is frequently used for leaving removable notes. This type of notation is envisioned because it tends to be of a color different than that of the page upon which it is applied. For example, notes such as these are typically made in noticeable colors of yellow, green, pink, or blue. In this manner, it is possible to detect their presence through the use of color recognition logic such as that described above with respect to FIG. 2.

Referring again to FIG. 4, in block 209 it is determined whether there is at least one notation on the scanned document. The notations are detected through the use of notation detection logic 150 (FIG. 2), which includes color recognition logic 135 (FIG. 2) contained within analysis code 120 (FIG. 2). Alternatively, other logic, such as logic that can detect shape (i.e., the rectangular dimensions of a notation) may be included in notation detection logic 150. Color recognition and the detection thereof is known to those having ordinary skill in the art and will not be explained in detail herein.

If in block 209 it is determined that a notation is not present on the scanned document, then in block 211 it is determined whether there is handwriting in the predetermined area of the document. As mentioned above with respect to block 202, the predetermined area of the document can be defined by the user or can be predetermined and/or preset by the analysis and processing logic 17. In order to determine whether there is handwriting present in the predetermined area of the document, handwriting detection logic 145 (FIG. 2) contained within analysis code 120 (FIG. 2) is employed. The detection of handwriting on scanned documents is also known to those having ordinary skill in the art and will not be described in detail herein.

If it is determined in block 211 that there is handwriting present in the predetermined area of the document, then in block 216 handwriting recognition logic 140 (FIG. 2) is used to read the writing and assign that writing as the filename of the scanned document.

If it is determined in block 211 that there is no handwriting present in the predetermined area of the document, then in block 217 the first few words of the document are used as the filename and the extension is applied based upon the default set in block 201.

If, in block 209, it was determined that there is at least one notation on the document, then in block 212 it is determined whether there is more than one notation on the document.

If, in block 212, it was determined that there is more than one notation on the scanned document, then in block 214 the first notation is used. To determine which is the first notation, the automatic filename assignation logic 110 can be configured using a variety of different rules with which to determine which notation is the first. Typically, the notation located nearest the top of the document will be considered the first. However, a user of the scanner may select any of a number of different rules determining which notation would be the first. For example, the automatic filename assignation logic may be configured to determine that the leftmost notation is the first. Furthermore, a default rule, which could be modified by a user if desired, could be set so that no interaction between the user and the automatic filename assignation logic is required.

After the first notation is used in block 214, then, in block 216, the handwriting recognition logic 140 (FIG. 2) is used to read the writing on the notation and assign that writing as the filename of the scanned document.

If, in block 212, it is determined that there is only one notation on the document, then, in block 216, the handwriting recognition logic 140 (FIG. 2) is used to read the writing on the notation and assign that writing as the filename of the scanned document.

Turning now to FIG. 5, in block 218, once the handwriting on the notation is analyzed in block 216, it is determined whether there is a file extension indicated in the text. A filename extension could be an extension indicated by the user to inform the automatic filename assignation logic 110 of the correct extension to apply to the document. For example, if the scanned image is a text document in Microsoft Word format, then a user might write ".doc" as the extension. In this manner, the automatic filename assignation logic 110 would know to assign the .doc extension and save the scanned image as a Word document. Other extension names can be, for example, .rtf (rich text format), .jpg (joint picture experts group), or .txt (for a text only document). The preceding are merely examples, as many other file extensions may be assignable.

If, in block 218, it is determined that there is no file extension indicated in the text, then in block 219 it is determined whether there is a preset default document type. As mentioned above, if the analysis and processing logic 110 set a default document type in block 201, then this default document type will be applied as the extension to the filename in block 221. If it is determined in block 219 that there was no preset default document type, then in block 222, the automatic filename assignation logic 110 will determine an appropriate file extension and apply it to the document. For example, if the document contains only a picture, the automatic filename assignation logic 110 will assign a .jpg extension. If the document contains only text, the automatic filename assignation logic 110 will assign a .doc extension. If the document contains a picture and text, the automatic filename assignation logic 110 will assign a .doc extension or a .txt extension.

If, in block 218, it is determined that there is a filename extension indicated in the text, then in block 223 the extension is assigned to the filename under which the document is saved.

In block 224 it is determined whether the analysis and processing logic 17 was set in block 204 to remove the notation or the handwriting in the predetermined area. If so set, then in block 226 the analysis and processing logic 17 processes the document to remove the notation or the handwriting in the predetermined area before presentation to the user. Next, in block 227, the document is saved using the indicated filename and extension indicating the document type.

If it was determined in block 224 that the analysis and processing logic 17 was set in block 204 to not remove the notation or the handwriting in the predetermined area, then in block 227 the document is saved using the indicated filename and extension indicating the document type. After block 227, the process returns to block 206 of FIG. 3.

Figure 6:
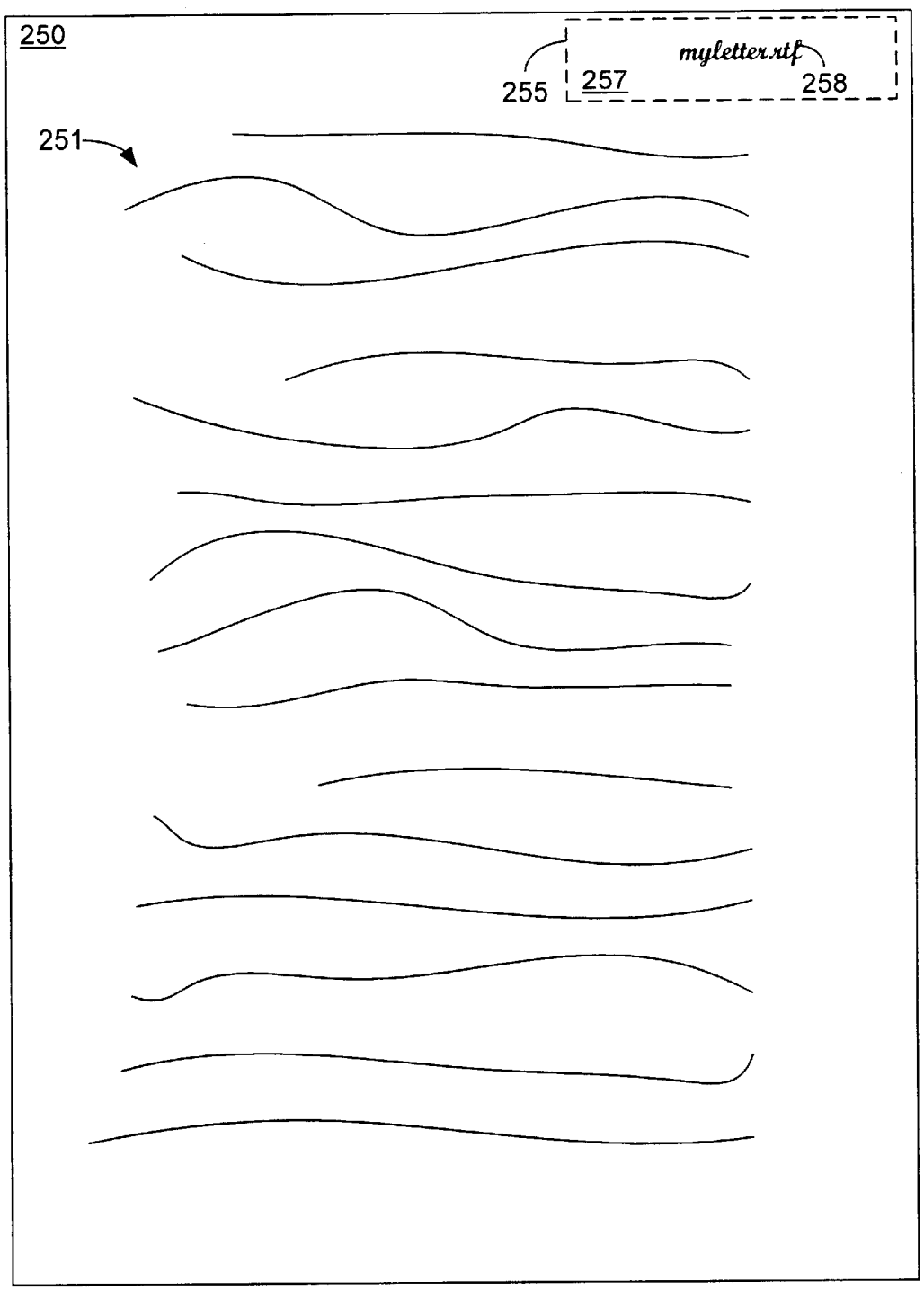
FIG. 6 is a graphical representation of one embodiment of the automatic filename assignation logic of FIGS. 1 and 2.

FIG. 6 is a graphical representation of one embodiment of the automatic filename assignation logic 110 of FIGS. 1 and 2. FIG. 6 illustrates sample page 250 on which text 251 is printed, written, or otherwise applied. Also on page 250 is bounding box 255. Bounding box 255 can be indicated by a user of the scanner by using a mouse and pointer to indicate the desired area, or may be predetermined by the analysis and processing logic 17. Bounding box 255 encloses a region 257, within which the automatic filename assignation logic 110, and the handwriting recognition logic 140 will analyze to determine whether any writing is present. In the example shown in FIG. 6, writing 258 is present within region 257. Writing 258 includes the text "my letter" followed by the extension ".rtf." By searching region 257 and recognizing the text 258, automatic filename assignment logic 110 will use the text and extension "my letter.rtf" as the filename under which the document 250 will be automatically saved. Also, because the extension designation ".rtf" is also present in region 257, the automatic filename assignation logic 110 will save the document in "rich text format." In this manner, no interaction is required from the user once the document is scanned. Alternatively, if no bounding box were selected, the first few words of the document are used as the filename under which the scanned image is saved.

Figure 7:
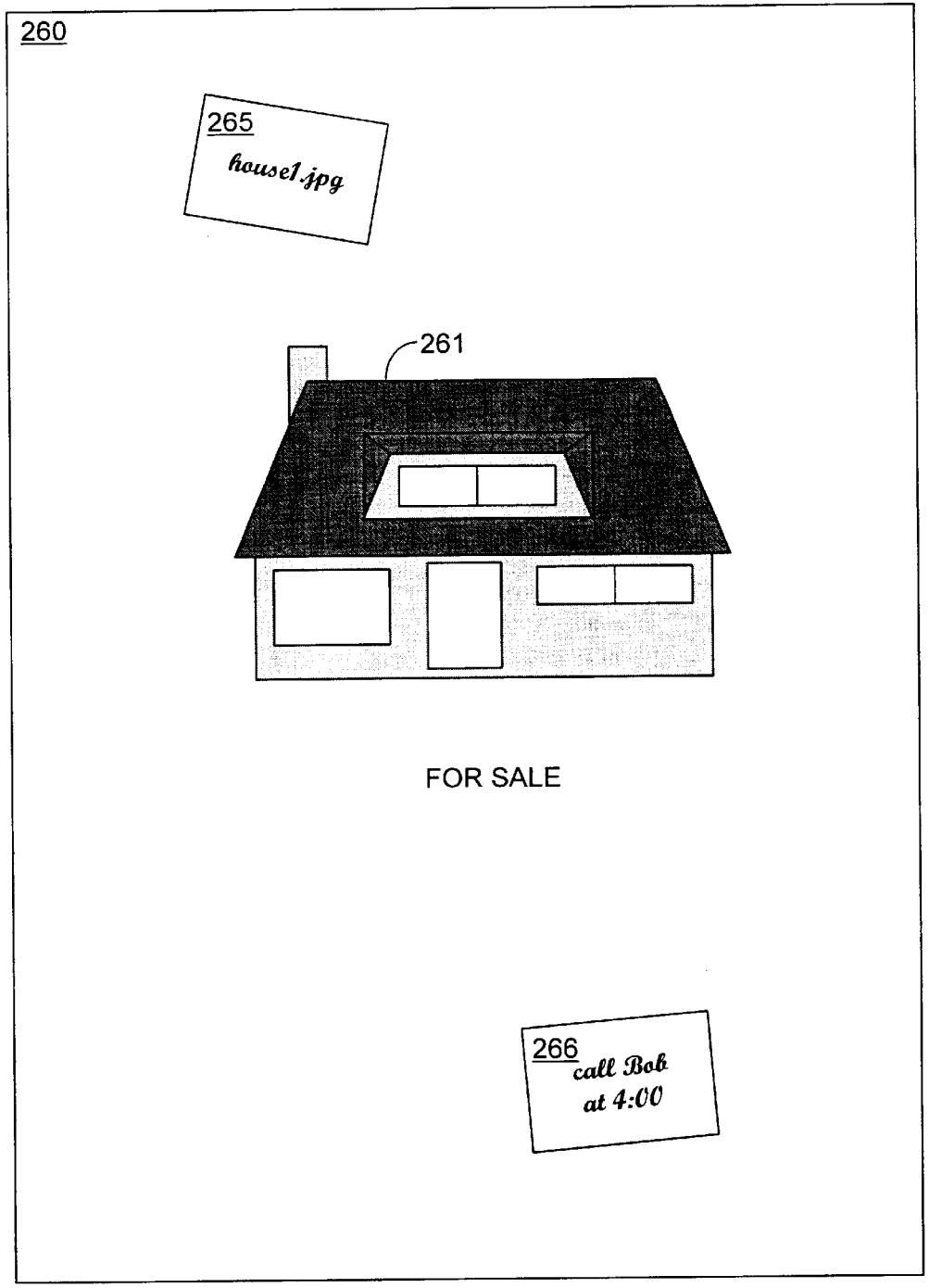
FIG. 7 is a graphical representation of an alternative embodiment of the automatic filename assignation logic of FIGS. 1 and 2.

FIG. 7 is a graphical representation of an alternative embodiment of the automatic filename assignment logic 110 of FIGS. 1 and 2. Page 260 includes image 261 and also includes notations 265 and 266. In this particular embodiment, the rule is set so that the notation closest to the "top" of the page is the first. Therefore, notation 265 is the first notation. As illustrated in FIG. 7, notation 265 includes the writing "house1.jpg." When page 260 is scanned, notation recognition logic 150 (FIG. 2) will detect notations 265 and 266. Notation 265 will be determined to be first, and therefore it will be the one that automatic filename assignation logic 110 analyzes to automatically assign the filename. Once notation recognition logic 150 (FIG. 2) detects notation 265, handwriting recognition logic 140 (FIG. 2) will analyze the writing and assign the name "house1" and the extension ".jpg" to the scanned document when saved.

In the examples in FIGS. 6 and 7, were the .rtf, and .jpg omitted from the analyzed region 257 (FIG. 6) or the notation 265 (FIG. 7), then the automatic filename assignation logic 110 would determine whether there is a default document type set. If there is a default document type set, then the automatic filename assignment logic 110 will assign the corresponding extension. In the absence of a default document type, the automatic filename assignment logic 110 would assign the most appropriate extension to the name.

It will be obvious to those skilled in the art that many modifications and variations may be made to the preferred embodiments of the present invention, as set forth above, without departing substantially from the principles of the present invention. For example, the system and method for automatic filename assignment can be implemented using various scanning and computing products and can be implemented to distinguish between multiple region types in the same image. Furthermore, the system and method for automatic filename assignment can be implemented using any method of differentiating between areas having and lacking color. All such modifications and variations are intended to be included herein within the scope of the present invention, as defined in the claims that follow.

What is claimed is:

1. A system for automatically assigning a filename to a scanned image, comprising:
   a scanner;
   a document analysis and processing software component in communication with said scanner; and
   automatic filename assignment logic in communication with said document analysis and processing software component, said automatic filename assignment logic configured to detect a region in a scanned image, said region including filename information, and assign a filename to said scanned image based upon said filename information.

2. The system of claim 1, wherein said region is a predefined region in said scanned image.

3. The system of claim 1, wherein said region is identified by notation detection logic including color recognition logic configured to recognize a notation in said scanned image, said notation being of a color different than a color of said scanned image.

4. The system of claim 1, wherein said region is identified by designating said region as a filename type.

5. The system of claim 1, wherein said filename information includes a file extension.

6. The system of claim 3, wherein said notation includes said filename information.

7. The system of claim 2, further comprising handwriting recognition logic configured to recognize said filename information.

8. The system of claim 3, further comprising handwriting recognition logic configured to recognize said filename information.

9. A method for automatically assigning a filename to a scanned image, the method comprising:
   scanning an image in a scanner;
   detecting a region in said scanned image, said region including filename information; and
   assigning a filename to said scanned image based upon said filename information.

10. The method of claim 9, further comprising predefining said region in said scanned image.

11. The method of claim 9, further comprising identifying said region using notation detection logic configured to recognize a notation in said scanned image, said notation being of a color different than a color of said scanned image.

12. The method of claim 9, further comprising identifying said region by designating said region as a filename type.

13. The method of claim 9, further comprising including a file extension in said filename information.

14. The method of claim 11, further comprising including said filename information in said notation.

15. The method of claim 10, further comprising recognizing said filename information using handwriting recognition logic.

16. The method of claim 11, further comprising recognizing said filename information using handwriting recognition logic.

17. A computer readable medium having a program for automatically assigning a filename to a scanned image, the program including logic configured to perform steps of:
   scanning an image in a scanner;
   detecting a region in said scanned image, said region including filename information; and
   assigning a filename to said scanned image based upon said filename information.

18. The program of claim 17, further comprising logic configured to perform the step of predefining said region in said scanned image.

19. The program of claim 17, further comprising logic configured to perform the step of identifying said region using notation recognition logic configured to recognize a notation in said scanned image, said notation being of a color different than a color of said scanned image.

20. The program of claim 17, further comprising logic configured to perform the step of identifying said region by designating said region as a filename type.

21. The program of claim 17, further comprising logic configured to perform the step of including a file extension in said filename information.

22. The program of claim 19, further comprising logic configured to perform the step of including said filename information in said notation.

23. The program of claim 18, further comprising logic configured to perform the step of recognizing said filename information using handwriting recognition logic.

24. The program of claim 19, further comprising logic configured to perform the step of recognizing said filename information using handwriting recognition logic.

25. A method for assigning a filename to a scanned image, the method comprising:
- scanning an image;
- detecting a region in said scanned image that includes filename information in the form of text;
- determining the identity of the text by performing an optical character recognition operation; and
- assigning a filename to said scanned image, the assigned filename including the text as determined.

26. A method for assigning a filename to a document, the method comprising:
- scanning an image;
- determining whether there is writing in a predetermined area of the scanned image;
- if writing is determined to be in the predetermined area, then performing a character recognition operation on the writing and assigning a filename to the document, wherein the filename includes characters recognized from the writing;
- if no writing is determined to be in the predetermined area, then identifying text within a region of the scanned image, performing a character recognition operation on that text, and using a first portion of the recognized text as the filename for the document.

* * * * *